(12) United States Patent
Agrawal et al.

(10) Patent No.: US 6,696,381 B2
(45) Date of Patent: Feb. 24, 2004

(54) PROCESS FOR THE PREPARATION OF A NOVEL CATALYST USEFUL FOR SWEETENING OF SOUR PETROLEUM DISTILLATES

(75) Inventors: Brij Bahadur Agrawal, Dehradun (IN); Som Nath Puri, Dehradun (IN); Gautam Das, Dehradun (IN); Bir Sain, Dehradun (IN); Bhagwati Prasad Balodi, Dehradun (IN); Sunil Kumar, Dehradun (IN); Anil Kumar, Dehradun (IN); Pushpa Gupta, Dehradun (IN); Jai Prakash, Dehradun (IN); Onkar Singh Tyagi, Dehradun (IN); Turuga Sundara Rama Prasada Rao, Dehradun (IN); Gur Pratap Rai, Mumbai (IN)

(73) Assignee: Council of Scientific & Industrial Research, New Delhi (IN)

( * ) Notice: Subject to any disclaimer, the term of this patent is extended or adjusted under 35 U.S.C. 154(b) by 153 days.

(21) Appl. No.: 09/804,985

(22) Filed: Mar. 13, 2001

(65) Prior Publication Data

US 2002/0091063 A1 Jul. 11, 2002

(30) Foreign Application Priority Data

Nov. 17, 2000 (IN) .................................... 1030/DEL/2000

(51) Int. Cl.$^7$ .......................... C07D 487/22; B01J 31/18
(52) U.S. Cl. ........................................ 502/163; 540/140
(58) Field of Search ............................. 502/163; 540/140

(56) References Cited

U.S. PATENT DOCUMENTS 3,651,082 A * 3/1972 Mertens et al. ............. 540/136

OTHER PUBLICATIONS

Canham, G. W. Rayner; Myers, J.; Lever, A. B. P., Journal of the Chemical Society, Chemical Communications (14), 483–4 (English) 1973.*

Myers, J. F.; Canham, G. W. Rayner; Lever, A. B. P., Inorganic Chemistry, 14(3), 461–8 1975.*

\* cited by examiner

*Primary Examiner*—John M. Ford
*Assistant Examiner*—Thomas C McKenzie
(74) *Attorney, Agent, or Firm*—Ladas & Parry

(57) ABSTRACT

A process for the preparation of a supported catalyst comprising a Halogenated Phthalocyanine of cobalt, iron or manganese of formula 1

Formula 1

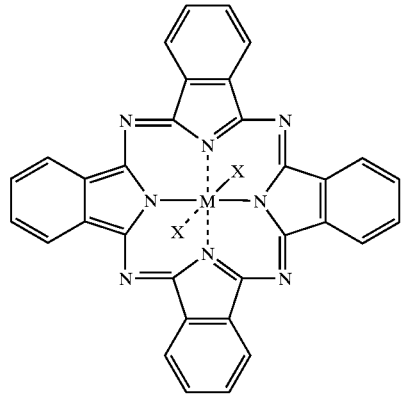

M = Co, Ni, Fe, Mn
X = Cl, Br, I which comprises: mixing a phthalocyanine of cobalt, iron or manganese with a halogenating agent in a stoichiometric ratio ranging between 1:1 to 1:20 optionally in an inert organic solvent, refluxing or heating and stirring for a time period ranging between 1–6 hrs, distilling the excess halogenating agent from the mixture, filtering and washing the residual mass by known method to obtain the desired halogenated phthalocyanine and impregnating a support material with the desired halogenated phthalocyanine.

17 Claims, No Drawings

PROCESS FOR THE PREPARATION OF A NOVEL CATALYST USEFUL FOR SWEETENING OF SOUR PETROLEUM DISTILLATES

A process for the preparation of a halogenated metal phthalocyanine catalyst suitable for sweetening of sour petroleum distillates.

Particularly the invention relates to a process for the preparation of various halogen containing derivatives of different metal phthalocyanines, useful for sweetening (oxidation of thiols to disulphides) of petroleum fractions like FCC gasoline, jet fuel, kerosene, heavy naphtha, thermal gasoline, diesel and distillate fuel oil.

It is well known that the presence of mercaptans in the petroleum products like LPG, naphtha, gasoline, kerosene, ATF etc. is highly undesirable due to their foul odour and highly corrosive nature. These are also poison for the catalysts and adversely affect the response of TEL (tetraethyl lead) as octane booster. Although there are several processes known for the removal of mercaptans from these petroleum products, the most common practice is to oxidize the mercaptans present to less deleterious disulphides with air in the presence of a catalyst. Commonly lower mercaptans present in LPG, pentanes, LSRN are first extracted in alkali solution and then oxidized with air in the presence of a catalyst. The higher molecular weight mercaptans present in petroleum products like FCC gasoline, LSRN, thermal gasoline and distillate fuel oil are oxidized to disulphides with air in presence of alkali in a fixed bed reactor containing catalyst impregnated on a suitable support (Catal Rev. Sci. Eng. 35(4),571–609(1993).

In the hitherto known processes, phthalocyanines containing metals like cobalt, iron and manganese are used to catalyze the oxidation of mercaptans to disulphides in alkaline medium. Among these cobalt and vanadium (especially cobalt) phthalocyanine and their derivatives are preferred. As these metal phthalocyanines are not soluble in aqueous medium, for improved catalyst activity their derivatives like sulphonated and carboxylated metal phthalocyanines are used as catalysts for sweetening of petroleum fractions. Various catalysts reported are cobalt phthalocyanine monosulphonate (U.S. Pat. Nos. 3,371,031; 4,009,120; 4,207,173; 4,028,269; 4,087,378; 4,141,819; 4,121,998; 4,124,494; 4,124,531), cobalt phthalocyanine disulphonate (U.S. Pat. No. 4,250,022), tetrasulphonate (U.S. Pat. No. 2,622,763), mixture of mono- and disulphonate (U.S. Pat. No. 4,248,694), phenoxy-substituted cobalt phthalocynine (Ger. Offen 3,816,952), cobalt and vanadium chelates of 2,9,16,23-tetrakis (3,4-dicarboxybenzoyl) phthalocyanine for both homogeneous and fixed bed mercaptan oxidation (Ger. Offen 2,757,476: Fr. Demande 2,375,201) and cobalt and vanadium chelates of tetrapyridinoporphyrazine (Ger. Offen 2,441,648).

It is also hitherto known that because of poor solubility of cobalt phthalocyanine in aqueous or other medium it is difficult to impregnate the same on the bed of catalyst support material. The highly sulphonated or other similar derivatives of cobalt phthalocyanine, though are soluble in the impregnating solution, their high solubility makes it difficult to place the required amount of catalyst on the support material. Furthermore, the more highly sulphonated or other similar substituted metal phthalocyanines are susceptible to leaching from the catalyst support when it is made alkaline with sodium or potassium hydroxide solution. The leaching causes loss of catalyst from the bed.

Metal phthalocyanine monosulphonate are thus the preferred compounds for impregnation on the support material in the fixed bed sweetening. The most common method used for their preparation is the reaction of metal phthalocyanine with oleum or sulphuric acid. However this reaction is difficult to control so as to produce metal phthalocyanine monosulfonate, exclusively because in this reaction, along with monosulphonate di- and tri-sulphonated derivatives are also formed. These derivatives of metal phthalocyanines, especially of cobalt phthalocyanine are much more soluble in hydrocarbon and in caustic solution than the former. This solubility characteristic is very important when the catalyst is used for the fixed bed sweetening of petroleum fractions. The catalyst once placed on the carrier must remain attached so that catalytic activity is maintained. The catalyst therefore should be such that it could be easily impregnated on the fixed bed material and yet is not leached out by alkali solution or hydrocarbons during the sweetening process.

Use of oleum during the preparation of metal phthalocyanine monosulphonate also posses waste disposal problems. Isolation of metal phthalocyanine monosulphonate from the reaction mass also affects the economics of the process.

The main objective of the present invention is to develop a process for the preparation of novel metal phthalocyanine based catalysts useful for sweetening of petroleum fractions like kerosene, FCC gasoline, jet fuel, heavy naphtha, thermal gasoline, diesel and distillate fuel oil in a fixed bed by impregnating the catalyst on a suitable support, which obviates the drawbacks as detailed above.

Accordingly the present invention provides a process for the preparation of a supported catalyst comprising a Halogenated Phthalocyanine of cobalt, iron or manganese of formula 1

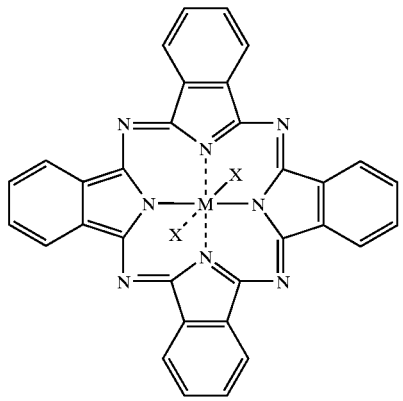

Formula 1

M = Co, Fe, Mn
X = Cl, Br, I which comprises: mixing a phthalocyanine of cobalt, iron or manganese with a halogenating agent in a stoichiometric ratio ranging between 1:1 to 1:20 optionally in an inert organic solvent, refluxing or heating and stirring for a time period ranging between 1–6 hrs, distilling the excess halogenating agent from the mixture, filtering and washing the residual mass by known method to obtain the desired halogenated phthalocyanine and impregnating a support material with the desired halogenated phthalocyanine.

In an embodiment of the present invention the metal phthalocyanine used is selected from cobalt and iron phthalocyanine.

In yet another embodiment of the present invention the halogenating agent used is selected from the group consisting of chlorine, bromine, iodine, thionyl chloride sulphuryl chloride, phosphorous pentachloride, phosphorous oxychloride, phosphorous pentabromide, phosphorous tribromide, thionyl bromide and phosphorous trichloride most preferably selected from thionyl chloride, phosphorous pentachloride and chlorine.

In yet another embodiment of the present invention the inert organic solvent used is selected from O-dichlorobenzene and nitrobenzene.

In yet another embodiment of the present invention the halogenated metal phthalocyanine catalyst prepared is selected form the group consisting of dichloro, dibromo, diiodo, mono chloro, monobromo and monoiodo derivatives of metal phthalocyanine preferably selected from dichloro and dibromo derivative of cobalt and iron phthalocyanine.

In still another embodiment of the present invention a novel catalyst prepared by the present invention is useful for the sweetening of sour petroleum distillates as herein described with reference to the examples.

The novelty of the present invention lies in the process for the preparation of a novel halogenated metal phthalocyanine catalyst suitable for the sweetening of wide range of sour petroleum distillates boiling above 140° C., like kerosene, jet fuel, fuel oil, naphtha, FCC gasoline in a fixed bed treating system. These higher boiling distillates generally contain mercaptans which are more difficult to oxidise, like tertiary mercaptans and aromatic thiols. The catalyst therefore has been evaluated with the feeds doped with various types of mercaptans in different concentrations as given in the examples. Although the supported catalyst of this invention is particularly applicable to the heavier petroleum distillates, it can also be used for the treatment of lower boiling distillates such as natural straight run and the cracked gasolines.

The following examples are given by way of illustration and therefore should not be construed to limit the scope of the invention.

Preparation of the Catalyst

EXAMPLE-1

30 parts by weight of cobalt phthalocyanine was slowly added with stirring to 400 parts by weight of thionyl chloride. The mixture was then refluxed (79° C.) with stirring for 4–5 hrs. The excess of thionyl chloride was then recovered by distillation from the reaction mixture and the residual mass added to 500 parts of ice cold water. The precipitated mass was filtered and washed with distilled/DM water till the washings were neutral. The mass was dried at 110° C. in air oven or at 50–80° C. under vacuum, yielding 32 parts of dichloro cobalt phthalocyanine.

EXAMPLE-2

In another typical preparation of the chlorinated cobalt phthalocyanine catalyst, 30 part by weight of cobalt phthalocyanine was added to about 400 parts of nitrobenzene, followed by addition of 150 parts of thionyl chloride. The mixture was heated with stirring at 60–80° C. for about 2 hrs. The reaction mass was then filtered, washed with ethanol and then ether and dried under vacuum at 80–100° C. This yields 32.5 parts of dichloro cobalt phthalocyanine.

EXAMPLE-3

In yet another typical preparation of the chlorinated cobalt phthalocyanine catalyst, 30 parts by weight of cobalt phthalocyanine and 300 parts by weight phosphorus pentachloride were heated at 95–105° C. for 4 hrs. The reaction mixture was then added to large excess of ice cold water. The reaction mass was filtered, washed with water and dried at 80–100° C. under vacuum to yield 32 parts of dichloro cobalt phthalocyanine.

EXAMPLE-4

In yet another preparation of the chlorinated cobalt phthalocyanine catalyst, 30 parts by weight of cobalt phthalocyanine was added to 300 parts by weight of o-dichlorobenzene. Chlorine gas was then passed into the reaction mixture with steaming at 40–50° C., till excess chlorine gas started to come out of the system (2 hrs). The reaction mass was filtered, washed successively with petroleum ether and water, dried under vacuum at 80–100° C. to yield 31.5 parts of dichloro cobalt phthalocyanine.

EXAMPLE-5

30 parts by weight of cobalt phthalocyanine was added to about 400 parts of nitrobenzene, followed by 150 parts of thionyl bromide. The mixture was heated with stirring at 60–80° C. for about 2 hrs. The reaction product was then filtered, washed with ethanol, and then ether. This was dried under vacuum at 80–100° C. to yield 37.5 parts of dibromo cobalt phthalocyanine.

EXAMPLE-6

In a typical preparation of chlorinated manganese phthalocyanine, 30 parts by weight of manganese phthalocyanine was slowly added with stirring to 400 parts of thionyl chloride. The mixture was refluxed (79° C.) with stirring for 4–5 hrs. The excess thionyl chloride was recovered by distillation from the reaction mixture. The residual mass was then filtered, washed with ethanol and then ether and dried under vacuum at 80–100° C. to yield 30.5 parts of chloro manganese phthalocyanine.

EXAMPLE-7

In a typical preparation of chlorinated iron phthalocyanine catalyst, 30 parts by weight of iron phthalocyanine were added to about 400 parts of nitrobenzene, followed by addition of 150 parts of thionyl chloride. The mixture was heated with stirring at 60–80° C. for about 2 hrs. The reaction mass was filtered, washed with ethanol followed by ether and dried in vacuum at 80–100° C. to yield 30.5 parts of dichloro iron phthalocyanine.

Evaluation of the Catalyst by Fixed Bed Sweetening of Kerosene

Feed was prepared by adding normal and tertiary mercaptans (nC8-50%, nC10-27%, nC12-20%, t-C12-3%) to the kerosene to bring mercaptan sulphur content to 325 ppmw. The catalyst (0.2 gm) was impregnated on charcoal (200 gm) as per the procedure described earlier. The feed was passed through the catalyst impregnated bed under fixed operating conditions and the mercaptan sulphur content in the product coming out of the reactor was estimated by UOP method 163-89. The operating conditions and results are shown in the following table:

TABLE

| Catalyst concentration, wt. % on charcoal bed | | | 0.1 |
| --- | --- | --- | --- |
| Mercaptan in feed, 'S' ppmw | | | 325 |
| Pressure, kg/cm² g | | | 6.00 |
| Air flow rate, liters/min | | | 1.2 |
| LHSV | | | 3.12 |
| Reaction temperature, ° C. | | | 40–45 |
| Cumulative feed processed, liters | Mercaptan in product, 'S' ppmw | Conversion of mercaptans to disulphides, % | Alkali injection |
| 5.0 | 1.56 | 99.54 | |
| 10.0 | 1.45 | 99.55 | |
| 15.0 | 5.24 | 98.38 | |

TABLE-continued

| | | | |
|---|---|---|---|
| 20.0 | 6.29 | 98.05 | |
| 25.0 | 10.07 | 96.88 | |
| 26.0 | 5.80 | 98.20 | 250 ml of 8% sodium hydroxide |
| 30.0 | 4.84 | 98.50 | |
| 35.0 | 9.55 | 97.04 | |
| 40.0 | 9.17 | 97.16 | |
| 43.0 | 12.53 | 96.12 | |
| 44.0 | 4.74 | 98.53 | 186 ml of 8% sodium hydroxide |
| 45.0 | 3.41 | 98.94 | |
| 50.0 | 7.80 | 97.67 | |
| 55.0 | 5.76 | 98.28 | |

Advantage of the Invention

The main advantages of the present invention over the previous inventions are (a) Halogenated metal phthalocyanine catalysts, unlike conventional sulphonated phthalocyanine catalysts, are not leached from the bed either by alkali or hydrocarbons. Once impregnated on the support material, these catalysts remain attached to the bed and the catalytic activity is maintained for very long time.

(b) Halogenated metal phthalocyanines show high catalytic activity in the fixed bed sweetening of various petroleum fractions like kerosene, FCC gasoline, NGL, LSRN, jet fuel, heavy naphtha, thermal gasoline, diesel and fuel oil.

(c) The preparation of halogenated metal phthalocyanines is simple and poses no isolation, working up and waste disposal problems.

(d) Unlike conventional sulphonation reaction where a mixture of mono-, di-, tri- and tetra-sulphonated metal phthalocyanines are obtained, the halogenation reaction of metal phthalocyanine described in this invention yields a single product.

What is claimed is:

1. A process for the preparation of a supported catalyst comprising a Halogenated Phthalocyanine of cobalt, iron or manganese of formula 1 wherein the - - - X is optional Formula 1

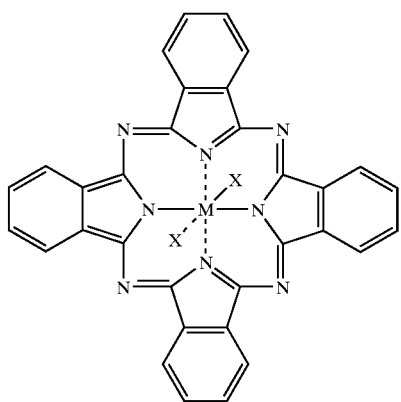

M = Co, Fe, Mn
X = Cl, Br, I which comprises: mixing a phthalocyanine of cobalt, iron or manganese with a halogenating agent in a stoichiometric ratio ranging between 1:1 to 1:20 optionally in an inert organic solvent, refluxing or heating and stirring for a time period ranging between 1–6 hrs, distilling the excess halogenating agent from the mixture, filtering and washing the residual mass by known method to obtain the desired halogenated metal phthalocyanine and impregnating a support material with the desired halogenated phthalocyanine.

2. A process as claimed in claim 1, wherein the phthalocyanine used is selected from cobalt and iron phthalocyanine.

3. A process as claimed in claim 1 wherein the halogenating agent used is selected from the group consisting of chlorine, bromine, iodine, thionyl chloride, sulphuryl chloride, phosphorous pentachloride, phosphorous oxychloride, phosphorous pentabromide, phosphorous tribromide, thionyl bromide and phosphorous trichloride.

4. A process as claimed in claim 1 wherein the inert organic solvent used is selected from O-dichlorobenzene and nitrobenzene.

5. A process as claimed in claim 1 wherein the catalyst prepared comprises a halogenated phthalocyanine selected from the group consisting of dichloro, dibromo, diiodo, monochloro, monobromo and monoiodo derivatives of metal phthalocyanine of cobalt, iron or manganese.

6. A process as claimed in claim 2 wherein the halogenating agent used is selected from the group consisting of chlorine, bromine, iodine, thionyl chloride, sulphuryl chloride, phosphorous pentachloride, phosphorous oxychloride, phosphorous pentabromide, phosphorous tribromide, thionyl bromide and phosphorous trichloride.

7. A process as claimed in claim 2 wherein the inert organic solvent used is selected from O-dichlorobenzene and nitrobenzene.

8. A process as claimed in claim 3 wherein the inert organic solvent used is selected from O-dichlorobenzene and nitrobenzene.

9. A process as claimed in claim 2 wherein the catalyst prepared comprises a halogenated phthalocyanine selected from the group consisting of dichloro, dibromo, diiodo, monochloro, monobromo and monoiodo derivatives of metal phthalocyanine of cobalt, iron or manganese.

10. A process as claimed in claim 3 wherein the catalyst prepared comprises a halogenated phthalocyanine selected from the group consisting of dichloro, dibromo, diiodo, monochloro, monobromo and monoiodo derivatives of metal phthalocyanine of cobalt, iron or manganese.

11. A process as claimed in claim 4 wherein the catalyst prepared comprises a halogenated phthalocyanine catalyst prepared is selected from the group consisting of dichloro, dibromo, diiodo, monochloro, monobromo and monoiodo derivatives of metal phthalocyanine of cobalt, iron or manganese.

12. A process as claimed in claim 1 wherein the halogenating agent used is selected from thionyl chloride, phosphorus pentachloride and chlorine.

13. A process as claimed in claim 1 wherein the catalyst prepared comprises a halogenated phthalocyanine selected from dichloro and dibromo derivatives of cobalt and iron phthalocyanine.

14. A process as claimed in claim 2 wherein the halogenating agent used is selected from thionyl chloride, phosphorus pentachloride and chlorine.

15. A process as claimed in claim 2 wherein the catalyst prepared comprises a halogenated phthalocyanine selected from dichloro and dibromo derivatives of cobalt and iron phthalocyanine.

16. A process as claimed in claim 3 wherein the catalyst prepared comprises a halogenated phthalocyanine selected from dichloro and dibromo derivatives of cobalt and iron phthalocyanine.

17. A process as claimed in claim 4 wherein the catalyst prepared comprises a halogenated phthalocyanine catalyst prepared is selected from dichloro and dibromo derivatives of cobalt and iron phthalocyanine.

* * * * *